AUTOMATIC FREQUENCY SHAPING NETWORK

Filed July 12, 1968 2 Sheets-Sheet 1

INVENTORS
GEORGE A. HELLWARTH
GARDNER D. JONES, JR.

BY John B. Inbone
ATTORNEY

Nov. 10, 1970 G. A. HELLWARTH ET AL 3,539,725

AUTOMATIC FREQUENCY SHAPING NETWORK

Filed July 12, 1968 2 Sheets-Sheet 2

United States Patent Office 3,539,725
Patented Nov. 10, 1970

3,539,725

AUTOMATIC FREQUENCY SHAPING NETWORK

George A. Hellwarth and Gardner D. Jones, Jr., Raleigh, N.C., assignors to International Business Machines Corporation, Armonk, N.Y., a corporation of New York Filed July 12, 1968, Ser. No. 744,398
Int. Cl. H04r *3/04*
U.S. Cl. 179—1 2 Claims

ABSTRACT OF THE DISCLOSURE

Two or more frequency-dependent linear filtering networks accept a common incoming signal. The several filtered signals are applied to automatic level control circuits each of which adjusts the signal amplitude to a predetermined constant level. A fixed summing network combines the constant-amplitude signals into a composite signal having the desired frequency distribution characteristics.

BACKGROUND OF THE INVENTION

Field of the invention

The invention relates to signal processing devices and more particularly to devices for automatically conditioning a signal to make its average frequency spectrum conform to a desired function.

Description of the prior art

Automatic level control circuits have been utilized for normalizing signals transmitted over telephone lines when these signals are to be automatically processed. This technique has not proved entirely satisfactory since the normal variation in the high frequency cutoff of telephone lines is large enough to affect severely the amount of high frequency signal transmitted, such as in a speech signal. Prior art automatic level controls operating in the average spectrum are incapable of conditioing the relative amplitudes across the signal spectrum since they treat the entire spectrum as an entity.

Frequency shaping networks have also been used to compensate for nonuniform transmission media characteristics however, these have been constructed on the assumption that the frequency attenuation characteristics of the medium were substantially constant and are therefore not satisfactory when used with transmission medium having normal variations large enough to affect selected frequency components of the signal.

SUMMARY OF THE INVENTION

The invention contemplates an automatic frequency shaping network for adjusting the frequency spectrum of signals transmitted over mediums having normal variations large enough to affect the amount of signal transmitted at the various frequencies within the overall medium. The invention is comprised of two or more frequency selective networks responsive to the transmitted signal each for compensating for the frequency transmission characteristics in its range, two or more automatic level control means each responsive to the signal passed by one of the frequency selective networks for compensating for variations in the signal level transmitted in the connected range, and summing circuit means responsive to the automatic level control output signals for reconstituting a controlled and shaped composite signal.

One object of the invention is to provide a frequency response filter characteristic which automatically adapts to variations in the characteristics of a transmission net work or system to provide a controlled signal spectrum suitable for processing.

Another object of the invention is to provide a system as set forth above which will not change the fine structure of the signal spectrum or the detail of its information content.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
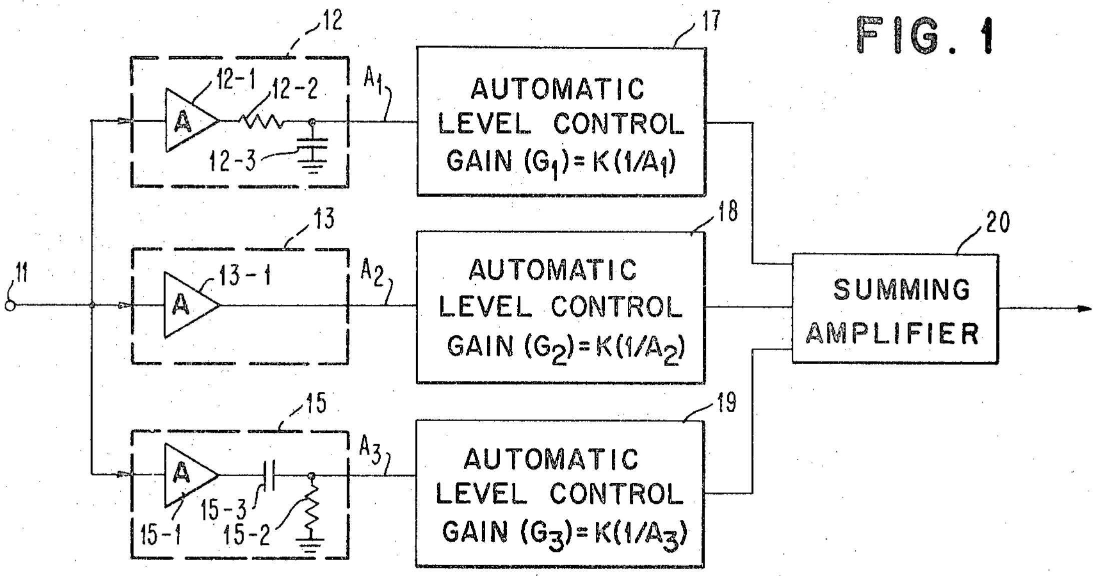
FIG. 1 is a schematic block diagram of an automatic frequency shaping system constructed in accordance with the invention, and FIGS. 2–6 inclusive, are graphs illustrating the operation of the circuit illustrated in FIG. 1.

In FIG. 1, the uncontrolled input signal from a telephone line or other transmission media is applied to an input terminal 11 which is connected to the inputs of three parallel connected frequency shaping networks 12, 13 and 15.

Network 12 includes an amplifier 12–1 for receiving the input signal, a resistor 12–2 connected between the amplifier 12–1 output and the output of network 12 and a capacitor 12–3 connected between the output of network 12 and ground reference potential. Resistor 12–2 and capacitor 12–3 comprise a conventional integrating circuit which provides a −6 db per octave attenuation as a function of frequency. The values of the circuit components are selected to provide unity gain at the frequency $\omega_c$ which is the center frequency of the band of frequencies passed over the transmission medium.

Network 13 includes an amplifier 13–1 only. This amplifier has a flat frequency characteristic over the band of interest and is used to provide a desirable nominal signal level.

Network 15 includes an amplifier 15–1 for receiving the input signal, a capacitor 15–3 connected between the output of amplifier 15–1 and the output of network 15 and a resistor 15–2 connected between the output of network 15 and ground reference potential. Capacitor 15–3 and resistor 15–2 comprise a conventional differentiating circuit which provides a +6 db per octave attentuation as a function of frequency. The values of the circuit components are selected to provide unity gain at $\omega_c$.

Networks 12, 13 and 15 described above, were selected for conditioning speech signals transmitted over convention telephone lines since these circuits provide frequency shaping characteristics which complement the frequency characteristics of the transmission medium. For other transmission medium and/or other signals different frequency shaping characteristics may be desirable which would require the use of networks having different filter characteristics complementing the medium and/or signal characteristics.

The outputs $A_1$, $A_2$ and $A_3$ of networks 12, 13 and 15 respectively are applied to automatic level control circuits 17, 18 and 19 respectively, which provide gains $G_1$, $G_2$ and $G_3$, respectively, that are proportional to the reciprocal of the amplitudes of the signals, as the several gains are automatically adjusted to maintain a constant output-signal amplitude for each circuit. Automatic level control circuits 17, 18 and 19 may be constructed as described by B. M. Oliver, "Automatic Volume Control as a Feedback Problem," Proc. of the IRE, vol. 36, No. 4, April 1948, pp. 466–473. The constant-amplitude outputs of the automatic level control circuits are connected to a summing amplifier 20 which reconstitutes, with fixed weights, a controlled shaped signal.

Figure 2:
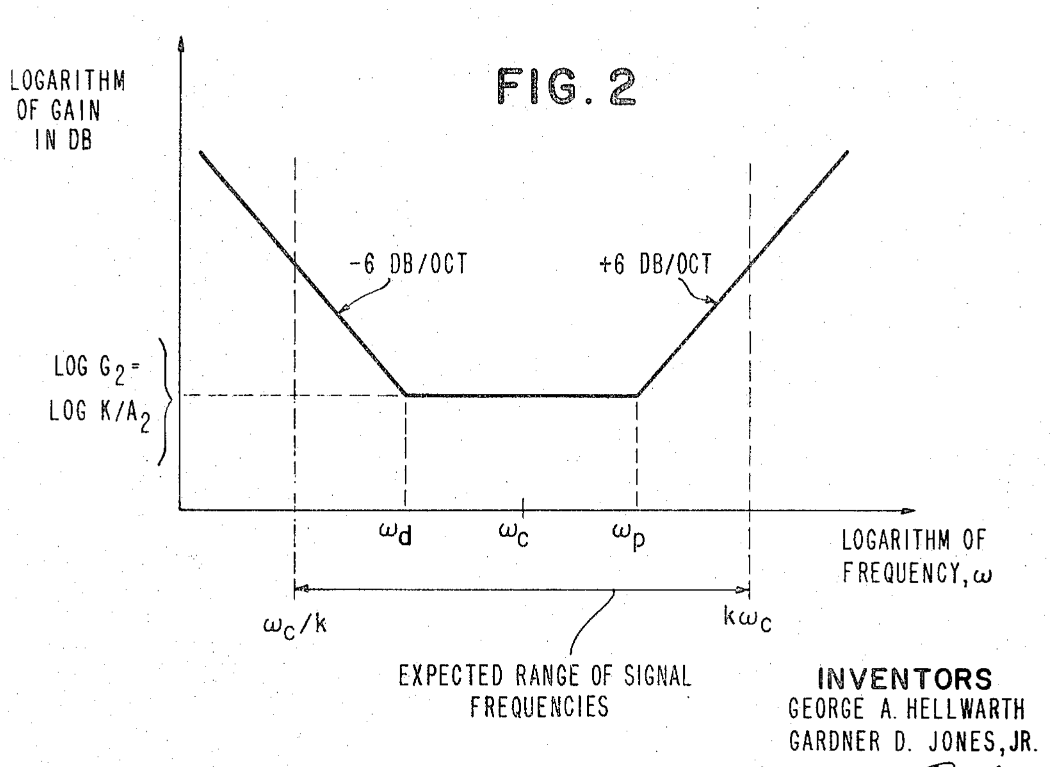

FIG. 2 is a graph illustrating the response characteristics of the system for a given input condition; and $\omega_c$ is the geometric center frequency of the expected signal band;
$\omega_p$ is the point at which preemphasis occurs:
$\omega_d$ is the point at which deemphasis occurs;
$k$ is a constant; and
$\omega_c/k$ and $k\omega_c$ define the signal band or expected range of signal frequencies.

The frequency $\omega_p$ above which the response curve is preemphasized is determined by the gain of the channel including network 13 relative to the gain of the channel including network 15 and the value of $\omega_c$ and many be expressed as follows.

$$\omega_p = G_2/G_3 \cdot \omega_c = A_3/A_2 \cdot \omega_c$$

The frequency $\omega_d$ below which the response curve is deemphasized is determined by the gain of the channel including network 12 relative to the gain of the channel including network 13 and the value $\omega_c$ and may be expressed as follows.

$$\omega_d = G_1/G_2 \cdot \omega_c = A_2/A_1 \cdot \omega_c$$

Figure 3:
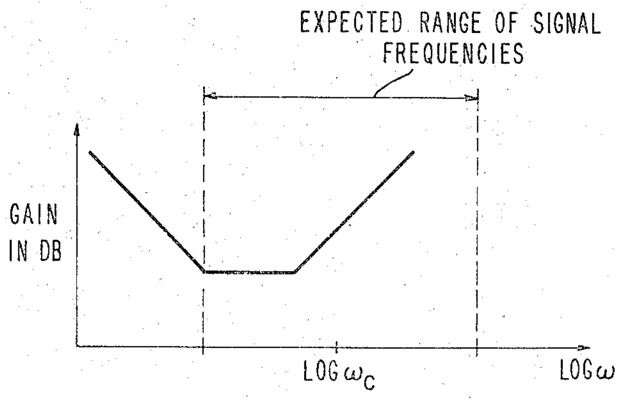
Figure 4:
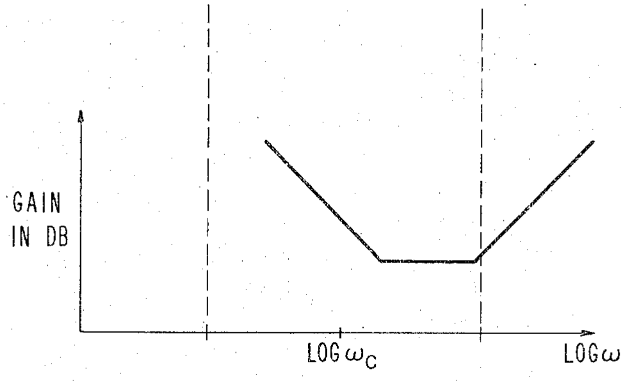
Figure 5:
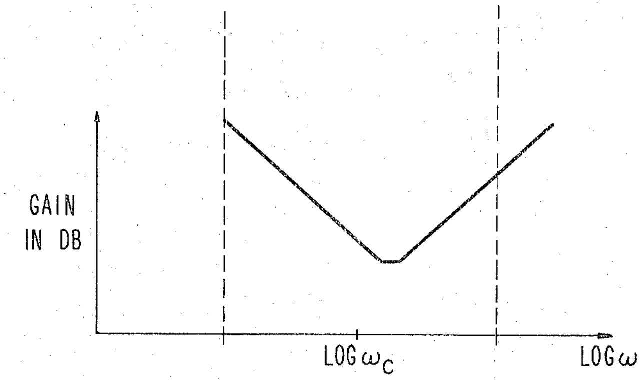
Figure 6:
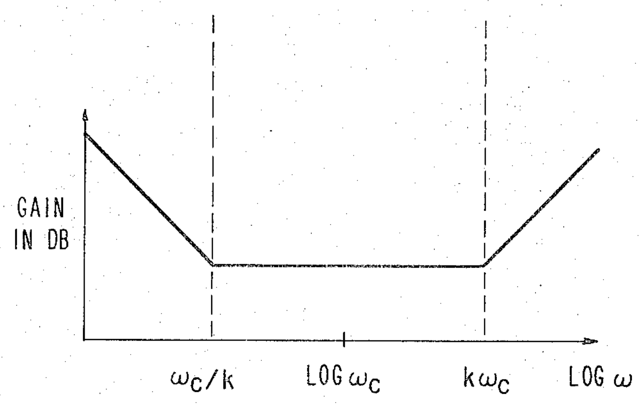

If the incoming signal is deficient in high frequency energy the response curve is preemphasized at a lower frequency. This is illustrated graphically in FIG. 3. System response for a signal deficient in low frequency energy is illustrated in FIG. 4. If the input signal has a flat or uniform spectrum, the values of $A_1$ and $A_3$ will be determined by the lower and upper band edges. In this case, the deemphasis and preemphasis frequencies move to the band edges and little or no effective corrective action by the system takes place.

The particular frequency shaping networks chosen for the illustrative system will have no effect on a signal with an excess of both high and low frequencies and will reproduce the input signal spectrum. This condition was not provided for with the particular frequency filters described since it would not occur in the environment contemplated. Different frequency shaping networks could be selected if this situation is to be encountered. The illustrated system compensates for six expected transmission conditions, i.e., excess high frequencies, deficient low frequencies, excess low frequencies, deficient high frequencies, deficient high and low frequencies relative to the midband frequencies, and uniformly distributed input frequencies.

While the invention has been particularly shown and described with reference to a preferred embodiment thereof, it will be understood by those skilled in the art that various changes in form and details may be made therein without departing from the spirit and scope of the invention.

What is claimed is:

1. An automatic frequency shaping network for adjusting the frequency spectrum of signals transmitted over signal transmission mediums having normal variations large enough to affect the magnitude of the signal transmitted at different frequencies within a predetermined band of frequencies comprising:

first frequency selective circuit means including an integrating circuit having a negative slope of approximately 6 db per octave responsive to the signal;

second frequency selective circuit means including a differentiator circuit having a positive slope of approximately 6 db per octave responsive to the signal;

third frequency selective circuit means having a flat frequency response within the said predetermined band of frequencies responsive to the signal;

first, second and third automatic level control means responsive to the first, second and third frequency selective means, respectively, for compensating for variations in the signal level transmitted in the range passed by the connected frequency selective circuit means; and summing circuit means responsive to the first, second and third automatic level control means for combining the outptus thereof to provide a reconstituted controlled and shaped signal.

2. An automatic frequency shaping network as set forth in claim 1 in which said first and second frequency selective circuit means provide unity gain at the geometric center frequency $\omega_c$ of the said predetermined band of frequencies.

References Cited

UNITED STATES PATENTS

| | | | |
|---|---|---|---|
| 1,965,720 | 7/1934 | Nicolson | 179—1 |
| 2,474,191 | 6/1949 | Reid et al. | 179—1 |
| 3,293,364 | 12/1966 | Richter | 179—1 |

KATHLEEN H. CLAFFY, Primary Examiner

C. W. JIRAUCH, Assistant Examiner

U.S. Cl. X.R.

325—404, 424